United States Patent
Maeuser et al.

(10) Patent No.: US 8,153,237 B2
(45) Date of Patent: Apr. 10, 2012

(54) LAMINATED GLASS PANE HAVING AN INTEGRATED RETAINING ELEMENT

(75) Inventors: Helmut Maeuser, Herzogenrath (DE); Horst Mercks, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 896 days.

(21) Appl. No.: 12/088,945

(22) PCT Filed: Oct. 5, 2006

(86) PCT No.: PCT/FR2006/050994
§ 371 (c)(1),
(2), (4) Date: Aug. 27, 2008

(87) PCT Pub. No.: WO2007/042716
PCT Pub. Date: Apr. 19, 2007

(65) Prior Publication Data
US 2009/0148642 A1    Jun. 11, 2009

(30) Foreign Application Priority Data

Oct. 5, 2005 (DE) .......................... 10 2005 047 656

(51) Int. Cl.
*B32B 3/06* (2006.01)
(52) U.S. Cl. ...................... 428/192; 428/203; 296/190.1
(58) Field of Classification Search .................... 428/38, 428/192, 203; 296/190.1
See application file for complete search history.

(56) References Cited

U.S. PATENT DOCUMENTS

| 2,991,207 A | | 7/1961 | Miller | |
|---|---|---|---|---|
| 3,843,193 A | * | 10/1974 | Krings et al. | 296/96.22 |
| 3,953,630 A | * | 4/1976 | Roberts et al. | 428/38 |
| 2006/0232093 A1 | * | 10/2006 | Boehm et al. | 296/96.21 |

FOREIGN PATENT DOCUMENTS

| DE | 3227647 | | 1/1984 |
|---|---|---|---|
| DE | 19723596 | | 10/1998 |
| EP | 1 025 986 A1 | | 8/2000 |
| FR | 2 146 956 | | 3/1973 |
| FR | 2 175 910 | | 10/1973 |
| WO | WO 00/53410 | | 9/2000 |
| WO | WO 2004/073976 A1 | | 9/2004 |
| WO | WO2004073976 | * | 9/2004 |

* cited by examiner

*Primary Examiner* — Gerard Higgins
*Assistant Examiner* — Christopher Polley
(74) *Attorney, Agent, or Firm* — Oblon, Spivak, McClelland, Maier & Neustadt, L.L.P.

(57) ABSTRACT

A laminated glazing with at least one rigid pane and an adhesive layer assembled to the rigid plane by surface bonding, via which a protective and/or functional sheet is applied to the rigid pane. The protective sheet is set back relative to an outer edge of the rigid pane, at least in certain parts. At least one retaining element is placed on the edge of the rigid pane in the region of the set-back of the protective sheet. The retaining element has a thickness approximately corresponding, or corresponding, to the maximum thickness of the adhesive layer at the edge of the protective sheet and is partially covered by the protective sheet at least in defined parts.

13 Claims, 2 Drawing Sheets

LAMINATED GLASS PANE HAVING AN INTEGRATED RETAINING ELEMENT

The invention relates to laminated glazing having the features of the preamble of Claim 1.

The term "laminated glazing" is understood here to mean multilayer structures composed of at least one rigid pane and an adhesive layer or sheet joined to said pane by surface bonding. The rigid pane, in general transparent or translucent, can be made of glass or a plastic. Other rigid panes may also be joined to the rigid pane by means of adhesive layers or sheets, it being possible for rigid glass or plastic panes also to be joined together into one and the same laminated glazing.

Many embodiments such laminated glazing are already known. Their common base objective is to provide a high level of security in fastening them into the respective window openings. This is valid not only in the case of normal window panes in vehicles and buildings, but also in the case of panes that are reinforced for special protection objectives, which panes are being used more and more frequently.

As a general rule, retaining elements are provided along the outer edge of the rigid pane, which restrict as little as possible the free field of view of the pane. The retaining elements may be discrete parts, strips or also peripheral frames, the latter case making it possible to achieve the highest level of security and furthermore providing a continuous cover for a slot formed between the outer edge of the laminated glazing and the frame.

Very different embodiments of laminated glazing with integrated retaining elements also exist, which elements are embedded in the plane of an adhesive layer between two rigid panes and project beyond the outer edge of the rigid panes.

Often, these retaining elements are produced in the form of continuous strips or strip portions bonded or formed by extrusion or projection on the laminated glazing. They may in turn contain other fastening elements for the pane.

In many application cases, functional layers or functional elements of low mechanical strength (thermal insulation layers, luminous layers, solar cells) are deposited on the glass panes, and it is necessary to protect them from any contact and from being scratched. For this purpose, it is possible to deposit a protective sheet, which is also transparent, with highly transparent adhesive masking layers onto the surfaces to be protected.

In yet other application cases, the protective sheet may itself be a support for functional layers, or in any case it may form part of such a support, possibly consisting of several layers. Added to such a covering or masking layer is also the function of retaining fragments, in addition to its optical, electrical and/or thermal insulation functions. Examples of sheets with functional layers are: illumination (LED, OLED, electroluminescence, etc.), layers for modifying the transmission on a sheet-like substrate (electrochromic, thermochromic, photochromic, etc.) or layers with switchable light transmission (LCD (liquid crystal display) elements, products of the Priva-Lite® (www.privalite.com) type, SPDs (suspended particle devices)) and sheets with layers that reflect infrared radiation.

Such protective sheets are also known in the form of what are called "fragment-retaining" sheets, or they may be used as such. In particular in the case of vehicles, they are applied to that surface of a window pane which is turned toward the interior of the passenger compartment. The object of these sheets is, in the event of a window pane shattering, to prevent fragments for penetrating into the passenger compartment and to stop any contact between those in the vehicle and the sharp edges that result from the shattering.

Plastic sheets of the types mentioned above are as a general rule provided with a scratch-resistant coating (for example made of a polysiloxane), in order to give their surface a high optical quality for a long period.

In the case of vehicles, sunroofs, which by nature are monolithic, are especially equipped with such protective sheets because laminated glazing consisting of two rigid panes and an adhesive layer cannot always be used in the roof region. Nevertheless, conventional laminated glazing is thicker, heavier and more expensive to manufacture.

One known example of protective sheets is the laminated system from DuPont commercially available under the brand name "Spallshield". It is composed for example of a thermoplastic (polyvinyl butyral or PVB) adhesive sheet with a thickness of 0.76 mm and a scratch-resistant sheet of PET (polyethylene terephthalate). The adhesive sheet is applied directly to the surface of the rigid pane and thus keeps the PET sheet, as the actual fragment protection layer, by surface bonding to the face of the pane.

If such a pane has to be bonded directly to a vehicle body or to be fitted with an adherent plastic strip (peripheral seal, assembly strip), the aforementioned scratch-resistant coating may however cause adhesion problems.

Document DE 103 55 896 A1 discloses laminated glazing with a sheet applied against the glass and cut set back along the edge, in which, in order to improve the adhesion of an assembly adhesive to the surface of the glass, said surface is only covered partly with the sheet in the region of the edge.

Document DE 102 06 717 A1 also discloses laminated glazing of this type with a protective sheet, in which the latter is itself formed as an additional mechanical retaining element.

The problem at the basis of the invention is how to provide laminated glazing with greater assembly security.

According to the invention, this problem is solved by the features of Claim 1. The features of the dependent claims provide advantageous embodiments of this invention.

With a retaining element, which is placed in an intimate assembly, with continuity of both shape and material, beneath the edge of the protective sheet and which is laid freely on the other side, a fastening function is provided in the event of damage. The retaining element itself forms, when the prestressed pane with the protective sheet is destroyed, an edge bond and a capture plane, with the protective sheet assembled to the latter, and thus the window fragments that adhere thereto are in all cases reliably retained on a frame structure or infrastructure. At the same time, the retaining element forms an additional flat fastening element and a capture plane preventing glass fragments from dropping at the edge of the protective sheet, especially when the laminated glazing is mounted in a roof or ceiling region.

At the same time, the retaining element forms a solid and reliable base for the fastening elements that have to be placed on the laminated glazing itself. Thanks to its small thickness, it emerges little, or even not at all, so that the protective sheet is practically parallel to the surface of the pane even in the region of its edge. Other measures also make it possible to reduce the visibility of the retaining element through the sheet and/or the pane. In total, optical defects (in reflected images in reflection and in transparency) due to the integrated retaining element are largely avoided or avoidable.

Of course, the retaining element may be composed of a plurality of elements, which may be juxtaposed or placed at defined distances from one another. In all cases, it must be manufactured from one material, which allows intimate mechanical assembly with the material of the adhesive layer and/or of other adhesives, and in particular with one or more fastening elements to be provided along the edge of the laminated glazing. this may for example be a woven or knitted fabric.

To introduce the retaining element under the edge region of the protective sheet, corresponding cuts may be provided in the adhesive layer, which are filled with adhesive during manufacture of the composite between the protective sheet and the pane. However, if the retaining element is flat enough and has a high absorptivity, it is also possible to work without such cuts in the adhesive layer, and thus practically embed the retaining element in the adhesive layer present.

As fastening elements, continuous plastic strips are preferably, but not exclusively, proposed, which may be directly formed (by projection or extrusion) or bonded (in the case of prefabricated strip portions) on the edge of the laminated glazing. Of course, fastening elements placed mechanically, by clamping, may also profit from the retaining element.

When the protective sheet serves at the same time as functional support for coatings or functional elements of the abovementioned type, the laminated glazing must of course also be equipped with external electrical fittings for electrically operated or switched functional elements, so that these elements can be connected to a current source or to a switching or control device.

This embodiment provides an alternative to known laminated glazing again composed of two rigid panes and an adhesive layer and at least secures them in the event of fracture.

Other details and advantages of the subject of the invention will become apparent from the drawings of an illustrative example and from their detailed description that follows.

In these simplified drawings, with no particular scale:

Figure 1:
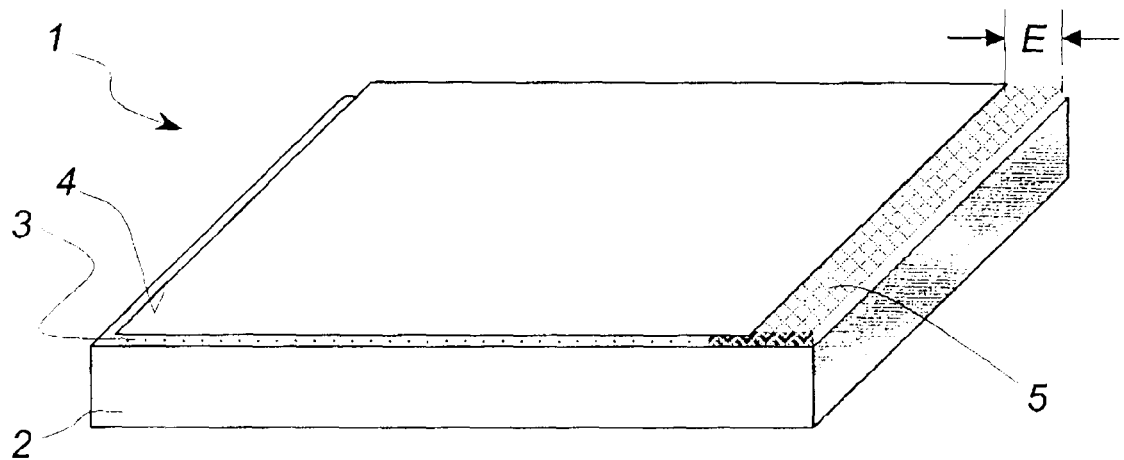
FIG. 1 is a schematic partial view in perspective of laminated glazing according to the invention.

In FIG. 1, the laminated glazing 1, shown here in part and in perspective, comprises a rigid pane 2 to the surface of which an adhesive layer 3 adheres. A protective sheet 4 is also applied so as to adhere to the surface of the pane 2 by means of this adhesive layer 3, so that the protective sheet 4 forms an external face of the laminated glazing 1.

It should be noted that the laminated glazing 1 illustrated and described here is admittedly a flat product, but glazing of cylindrical or slightly spherical shape may be equipped and produced in the same way. In all the figures, only portions of the laminated glazing 1 have been shown because, within the context of the present invention, only their edge regions are involved in the measures proposed by the invention.

The edge parts shown are certainly representative of the complete external perimeter of the laminated glazing. However, this does not exclude the possibility of having parts of the edge region configured in a manner other than the parts shown, without in any way departing from the scope of the invention.

The protective sheet 4 and the adhesive layer 3 may be made up as a prelaminate, for example in the form of the abovementioned DuPont product. It may in this case be a sheet of PET or PVC (TEDLAR) a few tenths of a millimeter in thickness laminated to a sheet of PVB with a thickness chosen from the usual thicknesses of 0.38 to 0.76 mm. Of course, it is also possible to use other sufficiently transparent adhesive layers (for example made of polyurethane or ethylene/vinyl acetate (EVA)) and other protective sheets and/or tear-resistant sheets.

When the pane 2 consists of prestressed glass, which shatters into a multitude of fragments having blunted edges when the compressibly stressed region fractures, the protective sheet with the adhesive layer again retains these fragments in the event of fracture. However, it is decidedly important, for the integrity of the surface of such a pane that can be used as a window pane or as a sunroof, for at least the protective sheet and/or the functional sheet itself to be strongly held in place against a frame structure, a mounting flange or the like. Such is the point particularly intended by the invention.

Along the outer edge of the laminated glazing 1 visible on the right-hand side in FIG. 1, the protective sheet 4 leaves a marginal band E free. For this purpose, it may, during the cutting operation, be cut shorter so that the face of the pane 2, cut set back after application relative to the external edge or removed in another way. As a general rule, the marginal band E will extend over the entire external perimeter of the laminated glazing 1. However, it is also possible to leave such marginal bands free only on specified parts, for example in the corners of the pane and/or at specified points on the lateral edges.

Figure 2:
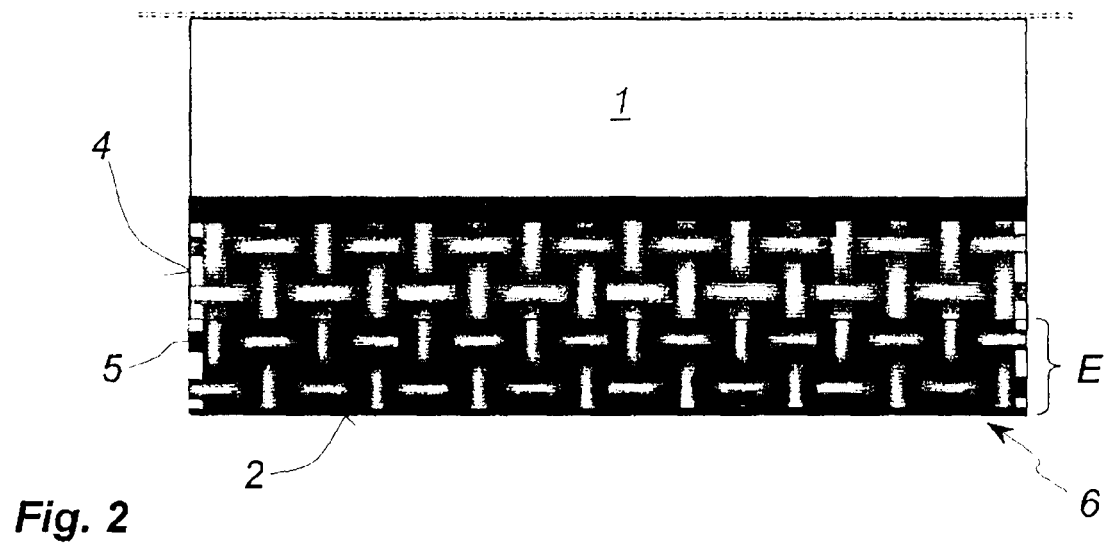
FIG. 2 is a plan view of an edge region of the laminated glazing of FIG. 1.

In the region of the marginal band E, vehicle windows are generally covered with an opaque coloured layer (usually printed and baked, also called a black printed zone), which is not shown here (see however FIG. 2 et seq.). The width of this coloured coating may vary greatly depending on the subsequent assembly point. This is also valid in principle as regards the width of the marginal band E itself, respectively the corresponding set-back cut or the removal of the edge of the protective sheet 4 relative to the external edge of the pane.

The marginal band E is covered with a band 5, serving as retaining element, made of a woven material, for example a tape of glass fibres, high-performance fibres, etc. The same band 5 also extends over a certain distance (from a few millimeters to a few centimeters) as a sandwich beneath the protective sheet 4 in such a way that an overlap zone is formed parallel to the marginal band between the protective sheet 4 and the band 5. Although the protective sheet 4 is by nature optically transparent, the retaining element or the band 5 cannot be seen in the overlap zone, or only slightly.

The band 5 therefore forms a reinforcing and retaining element partly covered by the protective sheet 4, which is assembled, by a suitable treatment method, adhesively and intimately with the pane 2, to the adhesive layer 3 and to the protective sheet 4. In total, what is obtained is a strong mechanical assembly between the band 5 on the one hand, and the pane 2 and the protective sheet 4 on the other. Preferably, the band 5 will have a reticulate structure, with free spaces that are sufficiently large to guarantee intimate penetration of liquid or viscous adhesives into the band.

The term "band" does not, however, exclude other possible ways of forming such flat retaining elements produced in accordance with the invention and integrated into the laminated glazing. For example, discrete lengths may also be provided, which are placed directly beside one another or at predetermined distances from one another along the edge of the laminated glazing 1. When later on we refer just to band, this does not in any way exclude these interchangeable options. The essential point is in this case that a material of the band or of any retaining element is able to form a high-strength bonded assembly with the adhesive layer 3 and with the surface of the pane, or with the lower face of the protective sheet 4, or alternatively that it can be securely fastened to the latter by adhesives. For example, it would also be possible here to introduce perforated bands made of a solid material or to place them partly beneath the protective sheet.

The fastening of the band 5 itself may be carried out in several different ways. For example, the band may be coated with an additional adhesive and temporarily fastened to the pane before the adhesive layer 3 is applied with the sheet 4 for protecting against fragments of the pane 2. This solution is recommended in particular when the band itself is not very thick or may be pressed flat.

Alternatively, thermal fastening of the PVB-based fabric or also solvent-based fastening is also possible. While the thermoplastic adhesive layer 3 is melting, it is also possible, using appropriate means (by applying a suitable vacuum for example), for said layer to uniformly embed the band and to be firmly bonded thereto, with force and shape continuity, after it has solidified.

The marginal band E is used in all cases in order to be able to assemble fastening means reliably to the surface of the pane, independently of the protective sheet 4 and of its scratch-resistant protective coating (which is not visible in the drawing). Cutting the anti-fragment protective sheet 4 set back in this edge region prevents the scratch-resistant coating of the anti-fragment protective sheet 4 from degrading the adhesive of assembly adhesive, edge strips, or the like.

The laminated glazing 1 is joined to the frame of a window opening using fastening means. The band 5 serves in this case as base for fastening, by adhesive bonding, these fastening means (continuous strips or lengths of strip, fittings, fixtures, etc.).

Figure 3:
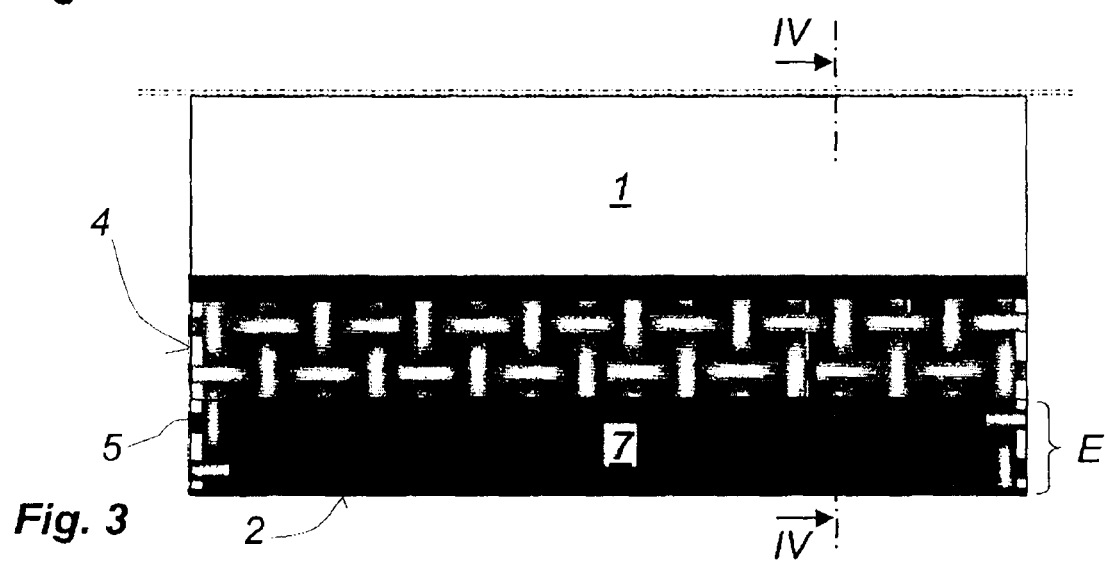
FIG. 3 is another plan view corresponding to FIG. 2, after another step of the process.

FIGS. 2 and 3 show a comparison of two stages in the manufacture of laminated glazing according to the invention. These plan views show clearly the set-back E of the protective sheet 4 with respect to the external edge (placed here at the bottom) of the pane 2.

The protective sheet 4 is shown semi-transparent in its outer edge region, in order in this way to illustrate the positioning of the band 5 with relatively large meshes and of the opaque coloured band 6, which is clearly visible here beneath the sheet 4. The coloured band 6 covers the marginal band E. Its width preferably corresponds to the width of the band 5 in such a way that the latter is not visible from the outside (via the rear through the pane 2). The coloured band, serving mainly for optical purposes (masking, covering against light rays and mainly UV radiation), may in principle be placed on one of the two faces of the pane 2, therefore on the inside or on the outside, or on both faces.

In the mounted position in a vehicle, the protective sheet is exposed towards the interior of the passenger compartment, while the glass face is exposed to the exterior.

The partial overlap of the band 5 by the edge of the protective sheet 4 is clearly visible. The band 5 extends along the outer edge of the pane 2. It may in principle be flush with said edge, or again may be set back relative to the latter (however not as far as the protective sheet 4), or else—depending on the fastening means—it may overhang the outer edge.

At the stage illustrated in FIG. 3, a length of a fastening means 7 (here in the form of a continuous strip adhering to the surface of the pane in the marginal band 3) has been added. As may be seen, this fastening means 7 covers the band 5 in the marginal band E left free by the protective sheet 4. It stops directly at the edge of the protective sheet 4. It is assembled by intimate bonding both to the band 5 itself and to the surface of the pane 2 by penetrating through the band or to the black printed zone 6 lying on the latter.

Figure 4:
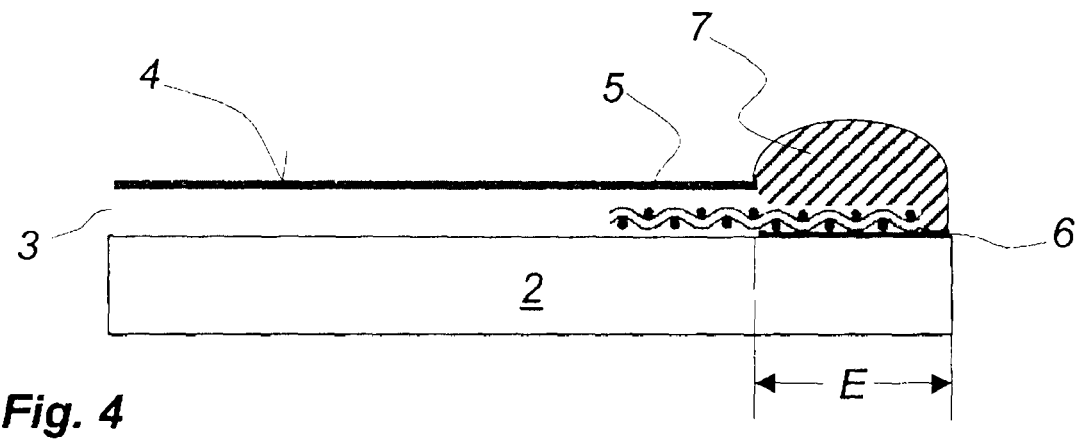
FIG. 4 is a sectional view of a first embodiment of the laminated glazing.

Although it is possible, in FIGS. 3 and 4, in order to illustrate the covering of the protective sheet 4 and of the retaining element or the band 5, to see the latter through the protective sheet 4, it is also possible to make the protective sheet itself opaque or in any case, less transparent in this region. This may be achieved for example by opacifying or colouring the material of the sheet itself, or else by applying an opaque coloured band.

FIG. 4 shows a cross section through the edge region of the laminated glazing 1 along the line IV-IV of FIG. 3. It may be seen even better here that the fastening means 7 is intimately assembled to the band 5 in the region of the marginal band E and is as wide as the marginal band E itself. Likewise, it may be clearly seen that the protective sheet 4 covers, in its edge region, the band 5, the latter being applied essentially directly onto the upper face of the pane 2 or of the coloured band 6 (printed here on the inner face or the sheet face of the laminated glazing).

The coloured band 6 conceals this region from being seen through the pane 2. It is slightly wider than the band 5 and it also protects the bonding region of the fastening means 7 against UV radiation which, from experience, may result in the plastic becoming brittle or debonding.

Figure 5:
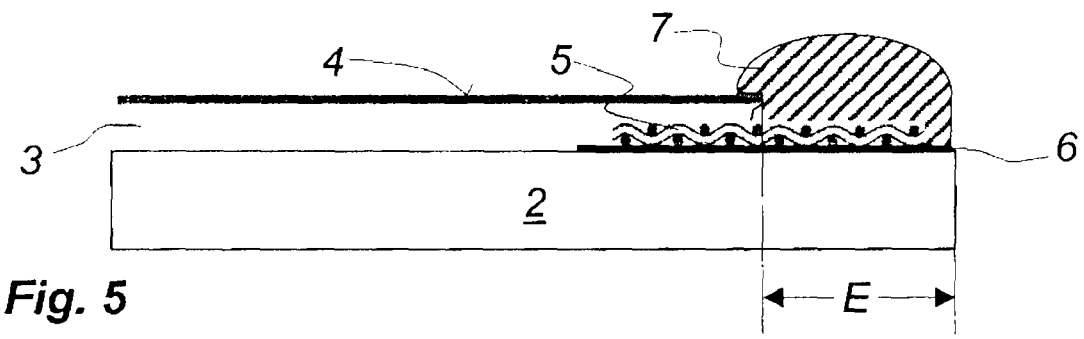
FIG. 5 is a sectional view of a second embodiment.

In an alternative embodiment shown in FIG. 5, the fastening means 7 also covers, in a configuration which for the rest is unchanged relative to FIG. 4, the edge of the protective sheet 4 over a short distance (a few millimeters), mainly for optical reasons. In this embodiment, it is therefore slightly wider than the actual marginal region E, or alternatively than the set-back of the outer edge of the protective sheet 4 relative to the outer edge of the pane 2.

It goes without saying that the fastening means for its part does not necessarily have to come flush with the outer edge of the pane 2, rather it may extend beyond the latter and possibly also be applied to the front face of the pane (edge protection function and/or slot cover function). Depending on the design of the structure, such a fastening means may even also cover a small part of the outer face of the pane 2, in such a way that any edge of the pane 2 is housed in the fastening means 7.

Figure 6:
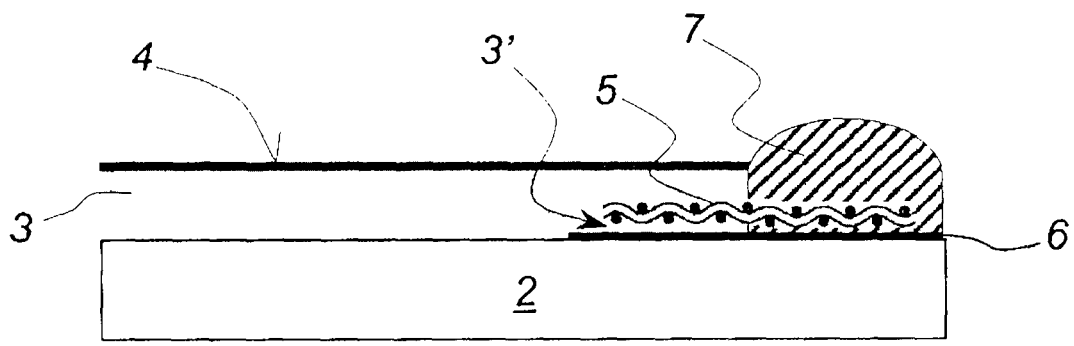
FIG. 6 is a sectional view of a third embodiment.

In the embodiment shown in FIG. 6, the band 5 has, at least in the region where it covers the protective sheet 4, been placed on a thin layer of adhesive 3', which is therefore positioned between the coloured band 6 and the band 5. The two layers of adhesive, 3 and 3', enclose the retaining element 5 between them in the region of its overlap by the protective sheet 4. In this way, again better adhesion and better assembly between the band 5 and the protective sheet 4 are ensured. Likewise, the adhesion of the fastening element 7 thus can be further improved. However, a slightly higher manufacturing cost would have to be accepted.

Options for fastening the band 5 to the surface of the coloured band 6 or of the pane 2 in the region E have not been shown. Here again, it is possible to provide a temporary or definitive bonded fastening of the band 5 or of similar retaining elements, if it is desired not to be only reliant on the capability of the material of the fastening element 7 to pass through the material of the band and to adhere in turn directly to the coloured band 6 or to the glass material. In general it is possible, in all the embodiments, to provide the coloured band 6 or, if the latter is not present, the marginal region E of the pane 2 with an adhesive/primer that guarantees long-term adhesion between an adhesive and the substrate.

Figure 7:
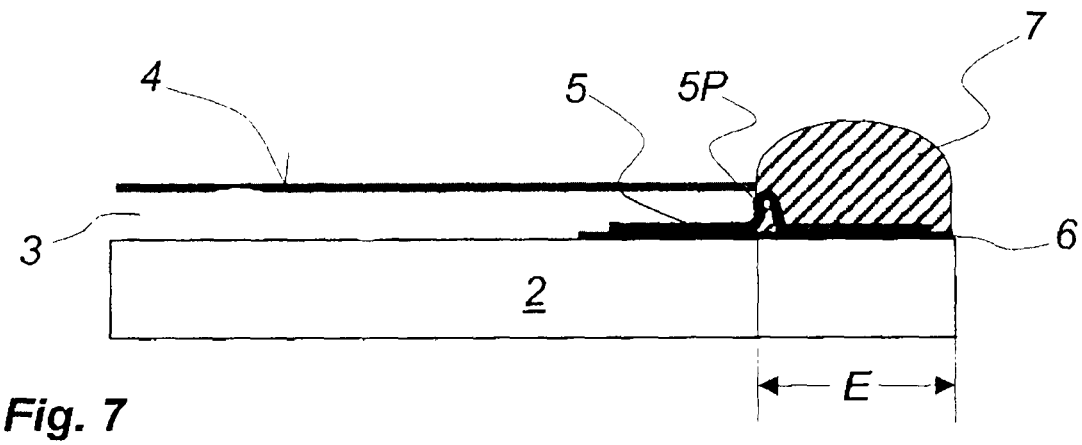
FIG. 7 is a sectional view of a fourth embodiment.

Whereas in the figures discussed up until now, the band 5 has been shown and produced as a component applied flat, in the embodiment shown in FIG. 7 it has been produced with an additional fold or loop 5P. This lies to the outside of the surface covered by the protective sheet 4, and therefore within the marginal band E.

In the event of the prestressed pane 2 being damaged, it is known that expansion forces are temporarily released in the plane of the pane. The pane "expands" slightly beyond its initial outline. The relative expansion that results therefrom may be taken into account by construction by means of the fold 5P, because the latter by nature allows an expansion or deformation of the band 5 and forms a kind of stop zone, which allows, to a certain extent, the band also to deform perpendicular to the plane of the pane. The band 5, or alternatively its functional equivalents already mentioned above, thus form a kind of safety/stop-plane system for the damaged pane. Placing the fold 5P in the region of the joint between the edge of the protective sheet 4 and the opposed edge of the fastening element 7 appears to be advantageous, so that the fold 5P can be deployed in the event of fracture, being thereby prevented by the mass of adhesive or by the fastening element 7.

Unlike the representation shown in FIG. 7, the fold 5P may also be flattened. For this purpose, the two coloured layers, beneath the fastening element 7, may be applied to the substrate of that part of the band 5 applied to the pane 2. In this case, it is necessary to ensure that there still remains a sufficiently wide adhesion base on the unfolded part of the band 5 for the fastening element 7. In this case too, the fold 5P can partially stretch under a large load (shattering of the window 2) and thus will fulfil its intended deformation and retention function.

The invention claimed is:

1. A laminated glazing comprising:
at least one rigid pane;
an adhesive layer assembled to the rigid pane by surface bonding, and protective sheet is applied to the adhesive layer, the protective sheet being set back relative to an outer edge of the rigid pane at least in certain parts;
at least one retaining element placed on the outer edge of the rigid pane where the protective sheet has been set back; and
a fastening element located on a flat zone of the retaining element not covered by the protective sheet and fastened to the laminated glazing by assembly with the retaining element, the fastening element extending over a marginal band of the rigid pane, which is left free by the protective sheet having been set back,
wherein the retaining element has a thickness which corresponds to the maximum thickness of the adhesive layer at an edge of the protective sheet and is partially covered by the protective sheet, at least in defined parts, and
wherein the retaining element includes at least one loop or fold, the loop or fold being located beneath a part of the fastening element laid on the marginal band of the rigid pane left free by the protective sheet having been set back.

2. A laminated glazing according to claim 1, wherein the retaining element extends in the form of a band around an entire perimeter of the laminated glazing and is covered completely over part of its width by the protective sheet.

3. A laminated glazing according to claim 1, wherein the retaining element is composed of plural initially separate parts, the separate parts being placed and intimately fastened close together or with defined distances between the separate parts in a marginal region of the laminated glazing.

4. A laminated glazing according to claim 1, wherein the retaining element is composed of a material allowing penetration by a flowing or viscous adhesive.

5. A laminated glazing according to claim 4, wherein the retaining element is composed of a material with cuts or passages or with surface roughness or of a woven or knitted material.

6. A laminated glazing according to claim 1, wherein the retaining element is gripped between two adhesive layers in a region of covering by the protective sheet.

7. A laminated glazing according to claim 1, wherein the fastening element is a continuous plastic strip, which is formed or bonded directly to the outer edge of the laminated glazing.

8. A laminated glazing according to claim 1, wherein the fastening element covers the marginal band of the rigid pane, which is left free by the protective sheet having been set back.

9. A laminated glazing according to claim 1, wherein the retaining element and a fastening element solidly assembled to the rigid pane on a base of the rigid pane form a closed frame containing the rigid pane.

10. A laminated glazing according to claim 1, wherein the rigid pane has reduced transparency in a region where the retaining element is placed, to form an optical mask, or is covered with an opaque colored band.

11. A laminated glazing according to claim 1, wherein the protective sheet has reduced transparency in a region of the covering with the retaining element, to form an optical mask, or is covered with an opaque colored band.

12. A laminated glazing according to claim 1, wherein the protective sheet forms at a same time a multilayer support or part of a multilayer support for functional layers.

13. A laminated glazing according to claim 12, further comprising external fittings for connection of electrical functional elements to a current source and/or to a control device.

* * * * *